United States Patent
Thrash et al.

(10) Patent No.: US 8,453,377 B2
(45) Date of Patent: *Jun. 4, 2013

(54) PLAYING-FIELD, SOIL TREATMENT APPARATUS AND METHOD

(75) Inventors: Tommy K. Thrash, Lubbock, UT (US); Jeremiah L. Foley, Lubbock, TX (US)

(73) Assignee: Aquasmart Enterprises, LLC, Lubbock, TX (US)

( * ) Notice: Subject to any disclaimer, the term of this patent is extended or adjusted under 35 U.S.C. 154(b) by 379 days.

This patent is subject to a terminal disclaimer.

(21) Appl. No.: 12/913,662

(22) Filed: Oct. 27, 2010

(65) Prior Publication Data

US 2011/0265376 A1 Nov. 3, 2011

Related U.S. Application Data (63) Continuation-in-part of application No. 12/789,177, filed on May 27, 2010, now Pat. No. 8,341,881, which is a continuation of application No. 12/324,608, filed on Nov. 26, 2008, now Pat. No. 7,726,070.

(60) Provisional application No. 61/012,912, filed on Dec. 11, 2007.

(51) Int. Cl.
*A01G 1/00* (2006.01)

(52) U.S. Cl.
USPC ........................................ 47/58.1 SC

(58) Field of Classification Search
USPC ........................................ 47/58.1 SC
See application file for complete search history.

(56) References Cited

U.S. PATENT DOCUMENTS

| | | | |
|---|---|---|---|
| 3,648,631 A | 3/1972 | Fiedler et al. | |
| 3,973,355 A | 8/1976 | McKenzie | |
| 4,579,587 A | 4/1986 | Grant et al. | |
| 5,394,812 A | 3/1995 | Dunning et al. | |
| 5,450,985 A | 9/1995 | Meuleman | |
| 5,794,550 A | 8/1998 | Chadwick | |
| 6,395,051 B1 | 5/2002 | Arnold et al. | |
| 6,669,752 B2 | 12/2003 | Arnold et al. | |
| 7,726,070 B2 * | 6/2010 | Thrash | 47/58.1 R |
| 8,196,346 B2 * | 6/2012 | Thrash | 47/58.1 SC |

(Continued)

OTHER PUBLICATIONS

Drill & Fill Manufacturing. Turf Tractor Specifications. http://www.drillandfillmfg.com/tractor.html. Accessed May 27, 2008.

(Continued)

*Primary Examiner* — Frank T Palo
(74) *Attorney, Agent, or Firm* — Pate Baird, PLLC (57) ABSTRACT

A material and method for maintaining a suitably dry sporting surface in natural soils may include a substrate treated with a layer of hydrating particles thereto. Various materials can serve as a hydrating, particulate coating. Polyacrylamide has been found to serve well and provide absorption to remove moisture that normally accumulates from a storms passing over a playing field. Soil treatment makes the soil surface ready to play on almost immediately. An amount of the amendment may be added to soil, mixed in, and watered before use, to provide more consistent properties such as natural bounce, reduced compaction, and reduced dust. The polymer may be embedded in mats to soak up standing water after storms, after which the amendment can be mixed into the soil to effectively tie up water that may otherwise create mud with the soil. Rain remediation may be done, whether or not the amendment was used for field preparation.

20 Claims, 7 Drawing Sheets

U.S. PATENT DOCUMENTS

| | | | | |
|---|---|---|---|---|
| 8,341,881 | B2 * | 1/2013 | Thrash | 47/59 S |
| 2003/0046865 | A1 | 3/2003 | Nishiyama | |
| 2007/0074315 | A1 | 3/2007 | Collin | |
| 2011/0265376 | A1 * | 11/2011 | Thrash et al. | 47/58.1 SC |

OTHER PUBLICATIONS

Drill & Fill Manufacturing. DF24—Drill & Fill Aerator Head Specifications. http://www.drillandfillmfg.com/drillfill.html. Accessed May 27, 2008.

Drill & Fill Manufacturing. D60—Drill Aerator Head Specifications. http://www.drillandfillmfg.com/drill.html. Accessed May 27, 2008.

Drill & Fill Manufacturing. Drill & Fill Aerification. http://www.drillandfillmfg.com/options.html. Accessed May 27, 2008.

Hogentogler & Co., Inc. Sieves: ASTM E-11 / AASHTO T-27. M-92. http://www.hogentogler.com/sieves/200mm_metric_sieves.htm. Accessed Dec. 11, 2007.

Graden USA, Inc. CSI Contour Sand Injection Specifications. http://www.gradenusa.com/_Sand_Injection.php. Accessed May 27, 2008.

Silica Fume Association. "What is Silica Fume?" http://www.silicafume.org/general-silicafume.html. Accessed May 27, 2008.

AZ Materials. Silica—Fumed Silica (Silicon Dioxide). http://www.azom.com/details.asp?ArticleID=1386. Accessed May 27, 2008.

DryJect: Soil Amendments. http://www.dryject.com/dryject/profile.cfm. Accessed May 27, 2008.

DryJect: How it Works. http://www.dryject.com/dryject/howitworks/index.cfm. Accessed May 27, 2008.

* cited by examiner

PLAYING-FIELD, SOIL TREATMENT APPARATUS AND METHOD

RELATED APPLICATIONS

This application is a continuation-in-part of, and hereby incorporates by reference U.S. patent application Ser. No. 12/789,177, filed on May 27, 2010, now U.S. Pat. No. 8,341, 881, which is a continuation of U.S. patent application Ser. No. 12/324,608, filed on Nov. 26, 2008, now U.S. Pat. No. 7,726,070, which claims the benefit of U.S. Provisional Patent Application Ser. No. 61/012,912, filed on Dec. 11, 2007.

BACKGROUND

1. The Field of the Invention

This invention relates to soils and, more particularly, to novel systems and methods for maintaining certain soils on playing fields, tracks, and arenas to operate as if dry.

2. The Background Art

Different types of soils perform their functions differently. In particular, rocky soils, sandy soils and the like tend to pass water freely. Likewise clay soils, such as exist in tennis courts, baseball fields, and the like tend to hold water, but yet tend to compact, harden, and not permit the water to distribute therethroughout. Typically, organic soils having substantial amounts of loam formed by organic matter such as leaves, other foliage, decaying plant matter, and the like provide absorption and holding of water.

Sports venues, playing fields, arenas, and the like may be constructed to host baseball, softball, horse racing, rodeo, other equestrian sports, dog racing, motor spots, golf, volleyball, tennis, football, soccer, cycling, or other sports. In such events a consistent soil is desirable. Weather especially rain, interferes. Waiting for weather and recovery is costly.

In general, soil may be altered on a small scale by addition of certain other soils, such as organic matter like peat moss, inorganic matter such as vermiculite, sand, and the like. On a large scale, soils are typically improved by growing and plowing under certain plants selected for their addition of organic matter. Likewise, waste materials from corrals, grain stalks (straw) and the like may be plowed into tracts of land in order to improve their organic content and their capacity to hold water for use by plants. Bare athletic field soils in arenas that depend on no plant matter are problematic. Plants and organic matter cannot be present to protect and remediate.

Many playing fields for athletic events are outdoors, some bare and some covered with grass. Some, like baseball and volleyball may be covered with grass, bare soil, or both in different regions. Plants, like grass, absorb considerable water, in part because they rely on water as a transport mechanism in order to draw nutrients from the ground into the plants through the roots and into the stems, leaves, and so forth. Likewise, water acts as a transpiration cooling mechanism by evaporation out through foliage of a plant. As a result plants will typically absorb large amounts of rainfall.

However, fields that have some portion of bare soil have only the soil to absorb water. If the soils have a significant fraction of clay, they absorb only a comparatively smaller amount of water, becoming slick. When dry, soils may be dusty. In rain, they may cling and glob together. Meanwhile they leave pools of standing water. Soils that absorb water will become soft and muddy, likewise unsuitable for use.

It would be an advance in the art to provide a mechanism whereby to automatically absorb and temporarily store within a soil, a certain amount of water, promoting run off as well. It would be helpful to have a mechanism to deal with water, allowing runoff, while relieving standing water by removal, drawing down into the soil or both to provide dry behavior by the soil.

BRIEF SUMMARY OF THE INVENTION

In view of the foregoing, in accordance with the invention as embodied and broadly described herein, a method and apparatus are disclosed in one embodiment of the present invention as including a material and method for rapid rehabilitation of playing fields, tracks, arenas, and other sports facilities at venues relying on underlying soil conditions. The invention may be applied to industrial grounds, unpaved residential paths, or sports venues. Playing fields, arenas, and the like may be constructed to host baseball, softball, horse racing, rodeo, other equestrian sports, dog racing, motor spots, golf, volleyball, football, soccer, cycling, or other sports.

All such may be treated by a soil amendment in accordance with the invention. A substrate may be formed of sand, rock, other inorganic material, or organic material, provided with a binder to temporarily or permanently secure a hydrating (e.g., hydrophilic) polymer such as polyacrylamide (PAM) in proximity to the substrate. In certain embodiments, the resulting composition may be mixed into the soil close to the top surface.

Mixing may be done before or after a rain storm, or both. After a storm, mixing absorbs excess water, rendering the surface playable. Also, the material may be mixed in as preparation to maintain a consistent hydration in the soil. When rain falls a certain amount will be absorbed, although some may run off to adjacent grass or other areas. The polymer absorbent may be used to treat foam mats for absorbing standing water before raking the material into the soil.

The polymer on the surface of the substrate absorbs, indeed draws in, remaining water. By mixing the composition into the dry soil in the absence of or before the occurrence of rain, the absorbent particles will hold additional moisture as necessary. The treated soil may be watered artificially (e.g., by hoses, sprinklers, or other irrigation systems) in preparation for use. The amendment renders soils more true in their softness and elasticity or resilience. Also, the hydrated polymer relieves soil compaction. The soil amendment as a maintenance material may be configured, to be mixed in as a remedial additive after a rainstorm, as an additive to dry soil to maintain humidity and moisture, as an absorber to receive and absorb rain, or any combination thereof. In any event, the material may be spread on a surface and then raked or mixed into, typically, the top ½ inch to 4 inches of the soil to be treated, depending on the functional purpose of the soil.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 1:
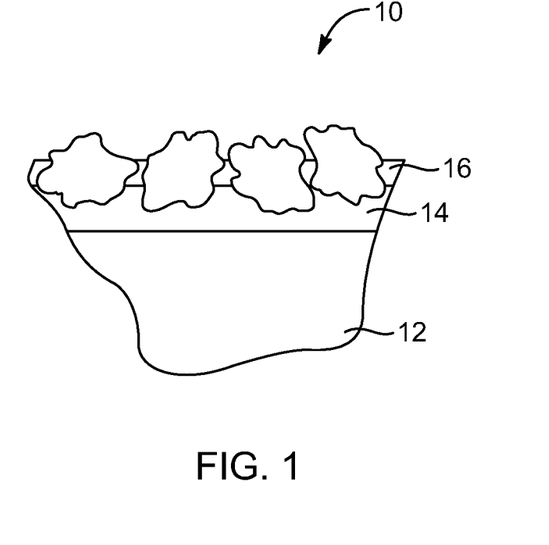
FIG. 1 is a schematic cross-sectional view of a portion of a granule of an amendment material including a substrate provided with a binder securing a hydrating polymer thereto in accordance with the invention.

Referring to FIG. 1, a material 10 in accordance with the invention may include a substrate 12 formed of a suitable material for placement in soil in bare ground or in the vicinity of a root system of a plant. For example, a substrate may be a particle of sand. In certain embodiments, even gravel, rock, or synthetic materials may operate as a substrate 12. In some embodiments, a substrate 12 may be formed of organic or inorganic material.

In some embodiments, a substrate material 12 may be a large expanse, such as a bat, mat, fiber, fabric, expanded polymer (e.g. foam) such as open cell polyurethane, or the like. It has been found that the hydration polymer material accelerates acceptance of moisture into polymer foams, aiding surface wetting and encouraging the foam to absorb water more readily.

Nevertheless, it has been found effective to use sand as a substrate 12 for mixing into soils inasmuch as it is submersible in water and will not float as many organic materials will when dry. Likewise, the sand as a substrate 12 is comminuted to such a small size that interstices between individual grains of the sand substrate 12 provide ample space and minimum distance for water to surround each of the substrate 12 particles.

In the illustrated embodiment, a binder 14 may be distributed as a comparatively thin layer on the surface of the substrate 12. Typical materials for binders may include both temporary and permanent binders 14. Temporary binders may be sugar-based or other water soluble materials. For example, corn syrup, molasses, and the like may form temporary binders. In the presence of water, such material may ultimately dissolve. Nevetheless, so long as the substrate 12 is not turned, mixed, or otherwise disturbed significantly, any other materials supported by the binder 14 would not be expected to dislocate.

Otherwise, certain naturally or synthetically occurring polymers may also be used as a binder 14. Lignicite may be used as a binder 14. Lignicite is a byproduct of wood, and provides material having good adhesive properties, and substantial permanence as a binder 14 on a substrate 12.

Other polymers may be used to form a binder 14. For example, various materials used as glues, including mucilage, gelatin, other water soluble polymers including, for example, Elmer's™ glue, and the like may also operate as binders 14 to bind materials to a substrate 12. Another binder 14, is water mixed with the absorbent material 18 itself, moistening the substrate 12 enough to render the polymer 18 "tacky" enough to bind to the substrate 12.

In certain embodiments, the amendment 10, based on the substrate 12, may be used in or on soils in outdoor environments. A pigment 16 may be added. Likewise, even if the substrate 12 and its contents bound thereto by the binder 14 are not to be seen, they may be pigmented with an appropriate pigment 16 simply for the purpose of identification of types or grades during selection, sale, or installation. Accordingly, a pigment 16 may be provided.

The pigment 16 may be implemented in any of several manners. For example, in one embodiment, a certain amount of the substrate 12 may have color, such as black grit or black slag distributed in a quantity of sand. In other embodiments, the substrate 12 may have pigment 16 applied prior to the application of the binder 14. In alternative embodiments, the pigment 16 may actually be included in the binder 14, which becomes a pigmented coating on the substrate 12.

In yet other embodiments, the pigments 16 may be added to a hydration particle 18 either as a pigment 16 mixed therein, or as a pigment 16 applied as a coating thereto. Thus the location of the pigment 16 in the Figures is schematic and may take alternative location or application method.

Particles 18 of a hydrophilic material may be bonded to the substrate 12 by the binder 14. Particles 18 may be sized to substantially coat or periodically coat the substrate 12. In some embodiments the substrate 12 may be a bat, mat, fabric, fiber, expanded or foamed polymer, or the like, having the hydrating particles 18 embedded in the hollows or interstices thereof.

In certain embodiments, the hydrophilic material 18 may be a powdered polymeric material 18 such as polyacrylamide. In other embodiments, the particles 18 may actually be organic material having capillary action to readily absorb and hold water. In one presently contemplated embodiment of an apparatus and method in accordance with the invention, the particles 18 may be formed of a powdered polymeric material in a dehydrated state, and having a capacity to absorb water, typically many times (e.g., up to 40 times) the weight of a particular particle 18.

The substrate 12, in certain embodiments, may be sand. The sand will typically be cleaned and washed to remove dust and organic material that may inhibit the binder 14 from being effective. Likewise, the substrate 12 may be sized of any suitable size. For example, sand particles may range from much less than a millimeter in effective diameter or distance thereacross to approximately two millimeters across. Very coarse sands may have even larger effective diameters. Likewise, in certain embodiments, gravel of various sizes may operate as a substrate 12. However in one presently contemplated embodiment, washed and dried sand such as is used in construction, such as in concrete, has been found to be suitable. Fine sands such as masonry sands tend to be smaller, and also can function suitably in accordance with the invention.

Accordingly, the distance across each particle 18 may be selected to provide an effective coating of powdered particles 18 on the substrate 12. In one presently contemplated embodiment, the effective diameter of the particles 18 may be from about a 30 mesh size to about a 100 mesh size. For example, a sieve system for classifying particles has various mesh sizes. A size of about 30 mesh, able to pass through a 30 mesh sieve, (i.e., about 0.6 mm) has been found suitable. Likewise, powdering the particles 18 to a size sufficiently small to pass through a 100 mesh (i.e., about 0.015 mm) sieve is also satisfactory. A mesh size of from about 50 mesh to about 75 mesh is an appropriate material to obtain excellent adhesion of particles 18 in the binder 14, with a suitable size of the particles 18 to absorb significant liquid at the surface of the substrate 12.

Larger particles may be used to provide larger effective porosity in soils to encourage water to pass down. As a practical matter, about half the volume of a container containing a substrate 12 as particulate matter will be space, interstices between the granules of the substrate 12. One advantage of using materials such as sand as the substrate 12 is that a coating of the particles 18 may provide a substantial volume of water once the particles 18 are fully saturated.

By contrast, where the size of the particles 18 is too many orders of magnitude smaller than the effective diameter or size of the substrate particles 12, less of the space between the substrate particles 12 is effectively used for storing water. Thus, sand as a substrate 12 coated by particles 18 of a hydrophilic material such as a polymer will provide substantial space between the substrate particles 12 to hold water-laden particles 18.

The diameter of the particles 18, or the effective diameter thereof, is typically within about an order of magnitude (e.g., 10×) smaller than the effective diameter of the particles of the substrate 12. This order of magnitude may be changed. For example, the order of magnitude difference less than about 1 order of magnitude (i.e., 10×) may still be effective. Similarly, an order of magnitude difference of 2 (i.e., 100×) may also function.

However, with particles 18 too much smaller than an order of magnitude smaller than the effective diameter of the substrate 12, the interstitial space may not be as effectively used. Likewise, with an effective diameter of particles 18 near or larger than about 1 order of magnitude smaller than the size of the particles of the substrate 12, binding may be less effective and the particles 18 may interfere more with the substrate itself as well as the flow of water through the interstitial spaces needed in order to properly hydrate a material 10.

Figure 2:
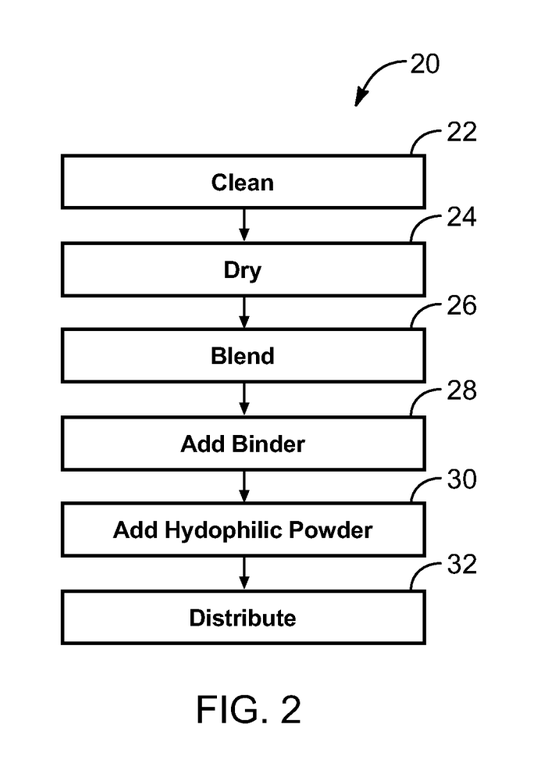
FIG. 2 is a schematic block diagram of one embodiment of a process for formulating and producing a hydrating, soil amendment material in accordance with the invention.

Referring to FIG. 2, an embodiment of a process for formulating the material 10 may involve cleaning 22 the material of the substrate 12. Likewise, the material of the substrate 12 may be dried 24 to make it more effective in receiving a binder 14. The material of the substrate 12 may then be blended 26.

In one embodiment, a ribbon blender provides an effective mechanism to perform continuous blending as the binder 14 is added 28. Other types of mixers, such as rotary mixers, and the like may be used. However, a ribbon blender provides a blending 26 that is effective to distribute binder 14 as it is added 28.

For example, if an individual particle of the substrate 12 receives too much binder 14, and thus begins to agglomerate with other particles of the substrate 12, a ribbon blender will tend to separate the particles as a natural consequences of its shearing and drawing action during blending 26.

As the binder 14 is added 28 to the mixture being blended 26, the individual particles of the substrate 12 will be substantially evenly coated. At this stage, the binder 14 may also be heated in order to reduce its viscosity and improve blending. Likewise, the material of the substrate 12 or the environment of the blending 26 may be heated in order to improve the evenness of the distribution of the binder 14 on the surfaces of the substrate 12 materials or particles 12.

Blending 26 of the binder 14 into the material of the substrate 12 is complete when coating is substantially even, and the texture of the material 10 has an ability to clump, yet is easily crumbled and broken into individual particles. At that point, addition 30 of the hydrophilic particles 18 may be accomplished.

For example, adding 30 the particles 18 as a powder into the blending 26 is a naturally stable process. Typically the particles 18 attach to the binder 14 of the substrate 12 particles, thus removing from activity that location. Accordingly, other particles 18 rather than agglomerating with their own type of material will continue to tumble in the blending 26 until exposed to a suitable location of binder 14 of the substrate 12. Thus, the adding 30 of the particles 18 or powder 18 of hydrophilic material will tend to be a naturally stable process providing a substantially even coating on all the particles of the substrate 12.

Just as marshmallows are dusted with corn starch, rendering them no longer tacky with respect to one another, the material 10 formulated by the process 20 are dusted with particles 18 and will pour freely. Accordingly, distribution 32 may be conducted in a variety of ways and may include one or several processes. For example, distribution may include marketing distribution from packaging after completion of blending 26, shipping to distributers and retailers, and purchase and application by users.

An important part of distribution 32 is the deployment of the material 10. In one embodiment of an apparatus and method in accordance with the invention, the material 10 may be poured, as if it were simply sand 12 or other substrate 12 alone onto a surface. It may be broadcast with turf spreading apparatus used to distribute fertilizers and top dressing. Since the powder 18 or particles 18 have substantially occupied the binder 14, the material 10 will not bind to itself, but will readily pour as the initial substrate material 12 will. Thus, the material will feed through spreaders readily. Optionally, it may then be worked into the soil by harrowing, disking, raking, or the like, which provides the best results.

Figure 3:
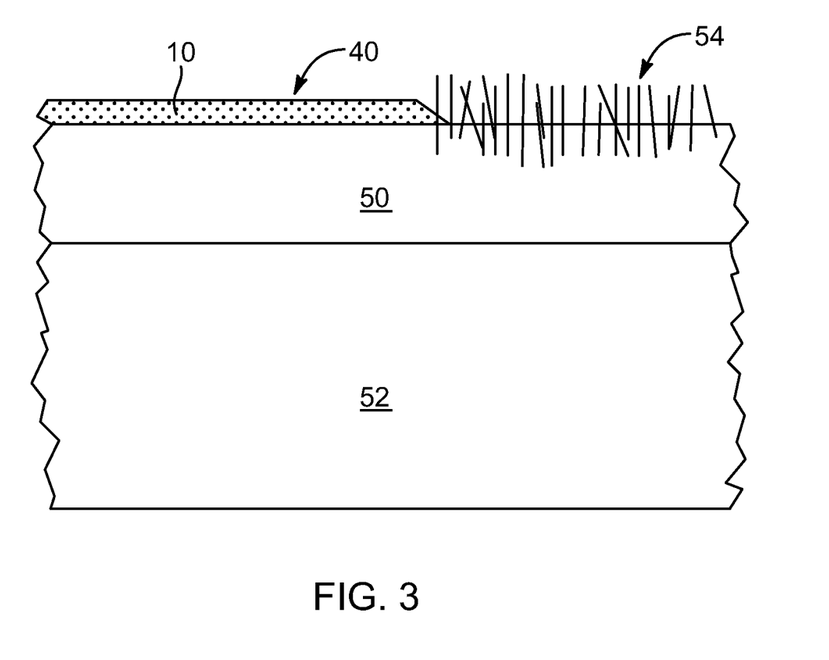
FIG. 3 is a cross-sectional view of one embodiment of one installation of a hydrating material in accordance with FIGS. 1 and 2 implemented to service a playing field as a "drying" layer by absorption as a hydrating material.
Figure 4:
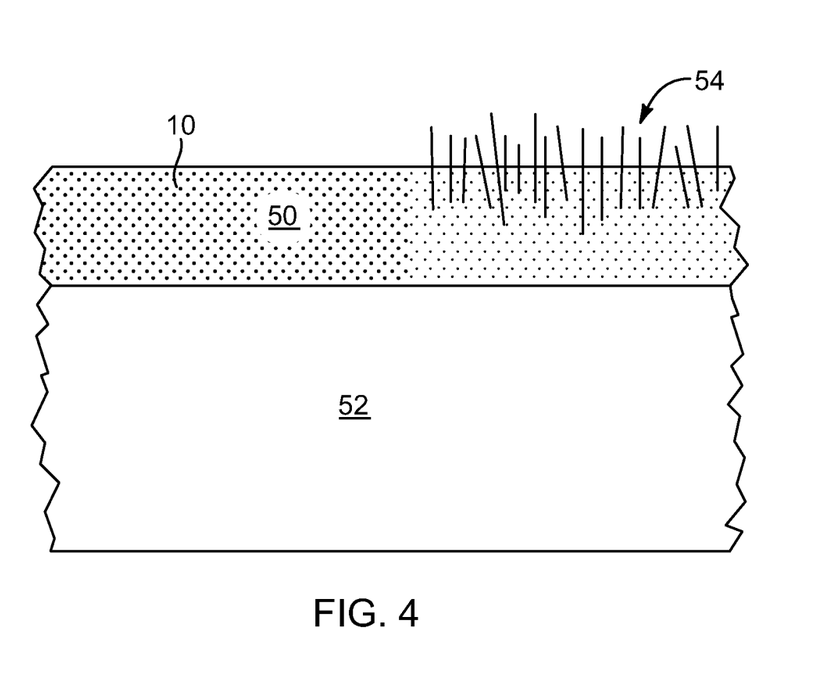
FIG. 4 is an alternative embodiment of an installation in accordance with the invention having the material of FIG. 1 distributed throughout a top region of a playing field to render the top layer of material more absorptive, binding up moisture to effectively provide a "dry" surface.

Referring to FIGS. 3 and 4, in one embodiment of an installation 34, distribution 32 may include pouring a layer 40 of the material on a field. In the illustration of FIG. 3, the process 34 or installation 34 may include applying the layer 40 as a top dressing of the material 10 to be worked into the working layer 50 of the soil 50.

In FIG. 4, the material 10 has been worked in to be part of the layer 50. The sub soil 52 is not normally affected, or benefitted, but would not be harmed by migration of the material 10 further downward. For pre-use preparation of playing fields, horse tracks, arenas, and the like, a working depth of the layer 50 varies from about one half to five inches, with three inches being suitable for almost all applications. For ball cleats the depth of penetration is about half an inch to an inch, typically about ¾ inch for penetration and grip or "purchase" by a cleat. However, deeper layers softens the ground. For horse tracks, two to three inches is more typically affected, so the universal depth of two to three inches is still appropriate. The depth of the layer 50 for every use may be worked as appropriate.

Referring to FIG. 4, once applied as in FIG. 3, the material 10 may be raked, harrowed, disked, dragged, or otherwise worked into the top layer 50 at the selected depth. For example, the material 10 may be added to the soil, mixed in, and watered repeatedly to maintain a consistent hydration before being watered to reduce dust and provide resilience or "bounce" by overcoming dryness, hardness, and soil compaction of clay soils.

On the other hand, the material 10 may be added to problem areas after a rain storm as rain remediation. Addition of the material 10 may be either instead of or in addition to the foregoing treatment where it is added as a general amendment when the soil is effectively dry. In this preparatory method from one to ten percent of the material 10, by weight is the polymer 18. The range of three to eight percent is adequate with about six percent being both functional and economical. It is best worked into a depth of about three inches at a material 10 rate of about half ounce to an ounce per square foot.

If the material 10 is added after a storm, and raked in or otherwise mixed with the top layer 50, the polymer 18 absorbs excess water that would otherwise tend to make mud of the soil. In this type of use the depth of mixing is from about one half to two inches, and one inch is usually adequate mixing. A common rake may typically be used to work the material 10 into the soil. Accordingly, the soil layer 50 remains functional, as if dry. The hydration polymer 18 and substrate 12 keep the soil 50 suitable for support of foot traffic of athletic, motorized, equestrian, or other sporting events. Even golf bunkers (sand traps) may be kept workable by these methods.

In the illustrated embodiment, the top dressing may have a surrounding environment 52 such as top soil or a playing surface material, which may be bounded by grass 54. The material 10 may thus act as a top dressing 56 for the bare soils when worked in to the desired depth. As a practical matter, it has been found that twenty-five square feet of soil may be treated by a mere pint of the material 10 having about three to eight percent, and most typically about five percent of the polymer 18 suffices. This, may effectively remediate about twenty five square feet of problem (wet) soil to a working depth of a half to one inch, or cleat depth, after a rainstorm.

With absorbent mats, standing water is first removed. Then the material 10 is spread. Thus, a rake, the material 10, and a few minutes of remediation may return the problem traffic areas of almost any playing field of bare soil to playable condition. Typically application rates may vary from about half an ounce to over two ounces of material mix 10 per square foot of soil at working depth (e.g. half-inch to an inch, typically about ¾ inch).

Also as mentioned above, the substrate 12 of the material 10 may also serve as a hydration amendment and compaction amendment material 10. For example, gravel, sand, grit, slag, vermiculite, perlite, or the like may be mixed with a top layer 50 in order to provide hydration absorption and holding due to the moisture capacity of the treated material 10. Sand has been shown to be of a size to function well for very effective distribution in a soil environment of a playing field.

The material 10 in accordance with the invention may be disposed in a layer 10 and worked into the soil layer 50 to absorb applied water faster and hold it longer. It may be added before watering to speed and then maintain hydration at a dustless working level. In this use the layer 50 may have a depth of from about one inch to about five, and most typically about three inches. The polymer material 18 is in the normal range of one to ten percent, but is typically most functional and economical at about six percent of the polymer 18 in the material 10 by weight.

Application rates may range from about half an ounce per square foot to up to 4 ounces per square foot, with about ⅔ ounce per square foot providing the soil with good water absorption, water holding, dust control, and "natural bounce" for running, baseball, and so forth.

Meanwhile, the layer 50 may be further prepared by spraying water thereon, and waiting for it to soak into the polymer 18 on the substrate 12 (e.g., sand, etc.). The process of watering and waiting may repeat. Nevertheless, it may tend to maintain a firm soil layer 50 by having the particles 18 of hydrophilic material absorb water remediating soil compaction and hardness by creating and maintaining spongy or resilient interstitial spaces around the substrate 12 particles 18.

When on or near the surface, exposed to air and sun, the few particles 10 in the layer 50 of material 10 will tend to dry more quickly and be ready to absorb later. Nevertheless, particles of the material 10 that are buried may tend to hold moisture longer, creating a more humid and moist, more resilient soil and maintaining soil moisture at a consistent level.

Thus, the material 10 applied in the layer 50 provides a reservoir engineered to provide a high degree of absorption (e.g., water in a gel) of whatever moisture does not drain immediately into the environment 50, 54.

In the various alternative embodiments, wherein the material 10 is worked into various suitable top layers 50 of soils of playing fields and similar venues known in the sporting art, the material 10 may be "sown" like seed or mixed in like other soil amendments into the soil layer 50 directly. Of course, the bulk of the soil 50 remains the native soil of the field. Addition of the material 10 represents only a minute fraction of the overall volume of the soil. A drill, harrow, rake, disk, drag or the like may be used. The tool, the weight, and the time will all contribute to the depth of distribution.

This preparation process of addition and mixing followed by watering before the field is used is usually deeper (up to three inches or more) than remediation immediately after storms. Addition and mixing done after a storm for immediate remediation is shallower, often as little as half an inch to an inch. In some embodiments, both may be done. Hydration is maintained in the larger, general traffic area, with some amount of the material 10. A storm, on the other hand, may be remediated in a few, smaller, problem areas. After removing standing water, this is done by simply sprinkling more material 10 and stifling up the shallower soil layer 50. The remediation is not to the full depth previously provided with the absorbing material 10 in the deeper layer 50 prepared by absorbing the extra water.

Thus, a greater concentration of material 10 may be added and raked in to a shallower depth after the storm. The material 10 may be used in one or both ways, added as a pre-treatment amendment in a thicker layer 50 watered in, added into a thinner layer 50 raked in upon the ending of a rain storm, or both.

Figure 5:
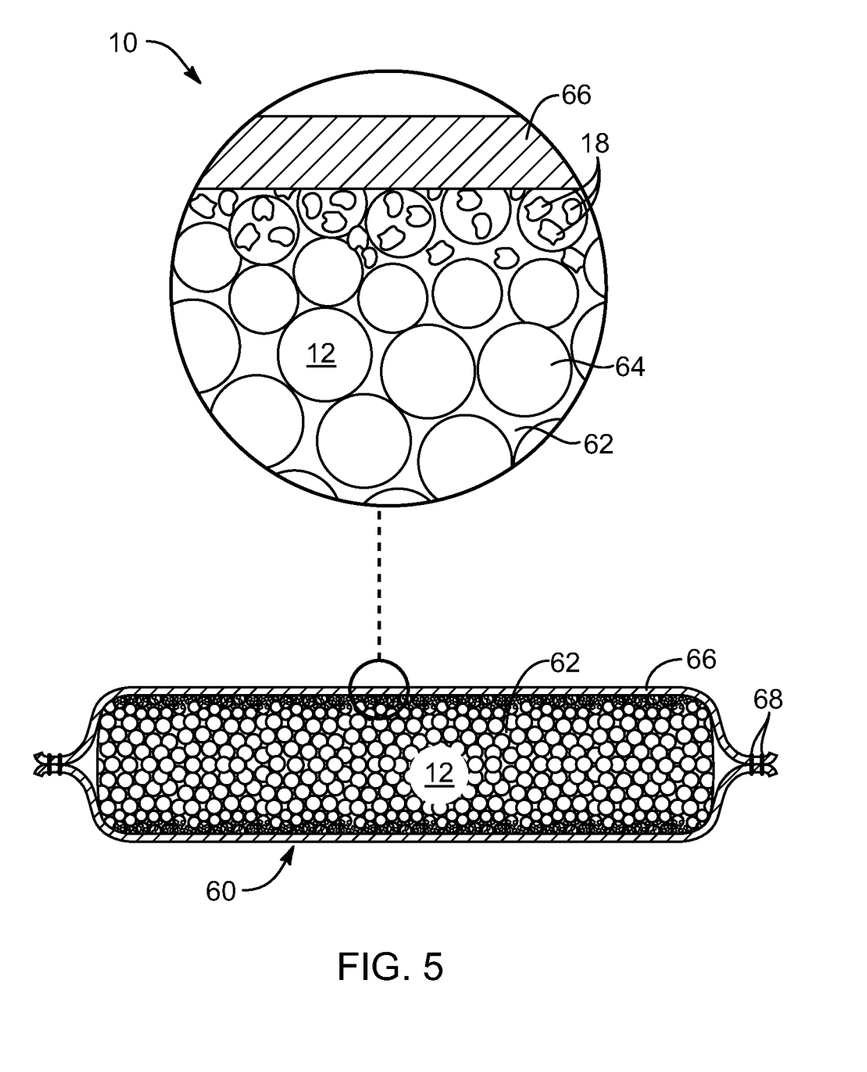
FIG. 5 is an end cross-sectional view of a mat or pillow having a foam substrate for absorbing standing water in accordance with the invention.
Figure 6:
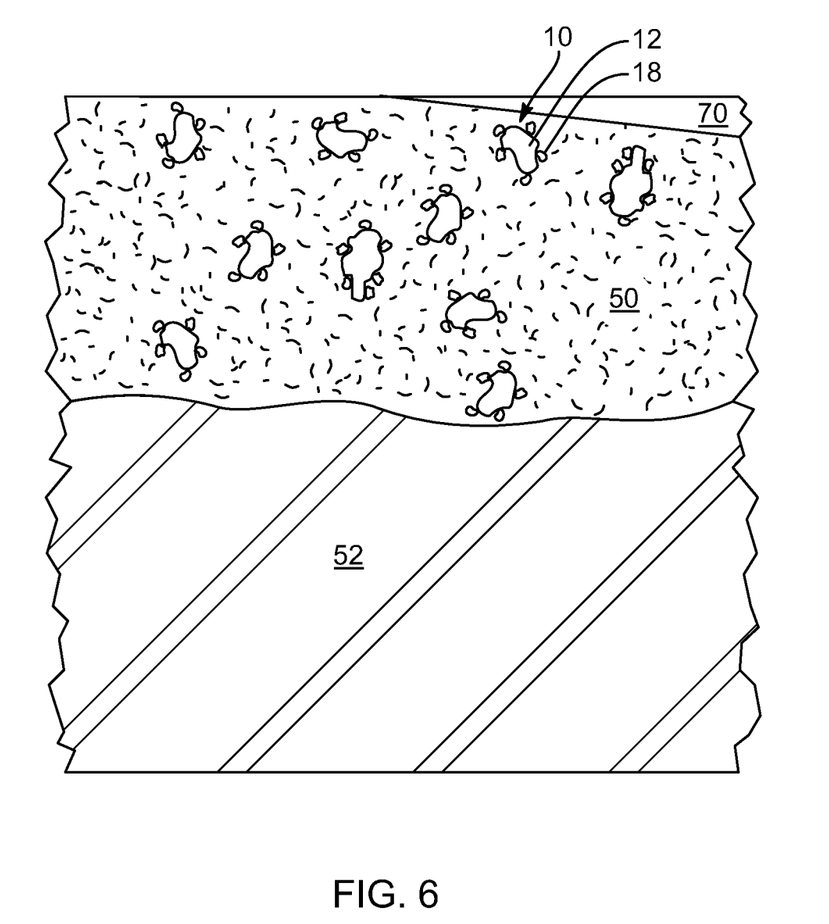
FIG. 6 is a cross-sectional elevation schematic view of an amended soil region in accordance with the invention.

Referring to FIGS. 5 and 6, in this alternative embodiment a material 10 is configured as a mat 60. The mat 60 may be formed of a carrier 12 formed of an open cell absorber 62 such as a polymer foam 62. Fibers, bats, fabrics, natural or synthetic, may be used. The foam 62 may be tumbled, mixed, beat, pumped, or otherwise worked to encourage the particles 18 to embed with the vacuoles 64, holes 64, or interstices 64 for the foam 12. In the embodiment of FIG. 5, the particles 10 may be surrounded by (distributed within) the polymer embedded at the depths thereof or near the surfaced the foam 62. A cover 66 of a permeable, stain-resistant fabric may be seamed 68 to form the mat 60 or absorbent pillow 60.

Referring to FIG. 6, in use, the mat 60 may be used to absorb standing water 70 puddling up in problem areas (e.g., low spots, muddy areas, etc.). The mat 60 may be placed in the standing water 70. The material 10 has been shown to greatly enhance absorption of water 70 by the mat 60. The polymer particles 18 quickly draw the water 70 into the polymer foam 62, which would otherwise not wet readily. The foam 62 as a carrier 12 for the polymer 18 supports the particles 18, which now swell to hold the water 70 in the foam. The mats 60 typically have no more than a few percent by weight of the particles 18, and about one percent or less is often suitable.

The mats 60 may be wrung out and reused immediately. Ultimately, the mats may be cleaned. The fabric cover 66 is readily renewed by washing if made of a suitable polymer such as polyester, oil boom fabric, or the like, which tends to be stain resistant. The mats 60 may be air and sun dried or mechanically dried for re-use. The mats 60 thus remove standing water 70, after which the material 10 of FIG. 1 may be spread and raked in as described hereinabove.

In all embodiments, premixed into the soil 50 mixed in after a storm, or both, the soil amendment 10 maintains the playing field surface ready for use. Absent long soaking or flood conditions, the field may typically be used within less than an hour after rain. After a storm delay, the soil layer 50, containing some of the material 10, runs off as much water as will readily flow away. The mats 60 soak up remaining standing water 70 in problem areas. The material 10 spread on top and raked into the top inch or less of the layer 50 then absorbs the remainder that would otherwise make mud in those localized, typically much smaller, problem areas.

The material 10 may typically include from about 1 percent to about 20 percent of a hydrophilic material 18 or particles 18. The particles 18 may be formed of a naturally occurring material, such as a cellulose, gelatin, organic material, or the like.

In one embodiment, a synthetic gel, such as polyacrylamide may be used for the particles 18, in a ratio of from about 1 to about 20 percent particles 18 compared to the weight of the substrate 12. In experiments, a range of from about 5 to about 10 percent has been found to be the most effective for the amount of particles 18.

Sizes of particles 18 may range from about 20 mesh to smaller than 100 mesh. Particles 18 of from about 50 to about 75 mesh have been found most effective.

The binder 14 may typically be in the range of from about in ¼ percent to about 3 percent of the weight of the substrate 12. A range of from about ¾ percent to about 1½ percent has been found to work best. That is, with a binder such as lignicite, ¼ of 1 percent has been found not to provide as reliable binding of particles 18 to the substrate 12. A binder is not always required.

Meanwhile, a ratio of higher than about 3 percent by weight of binder 14 to the amount of a substrate 12, such as sand, when using lignicite as the binder 14, tends to provide too much agglomeration. The pouring ability of the material 10 is inhibited as well as the blending 26, due to agglomeration. Other binders also operate, including the absorption material 18 itself when moistened with water, or one of several smaller molecules that are water soluble. For example, glues, gelatins, sugars, molasses, and the like may be used as a binder 14.

One substantial advantage for the material 10 in accordance with the present invention is that the material remains flowable as a sand-like material 10 into the area of roots and under a rootball or around the individual open roots of plants being transplanted. Thus, handling and application is simple, and the ability of granular material 10 to flow under and around small interstices between roots or between potting materials provides for a very effective application.

Figure 7:
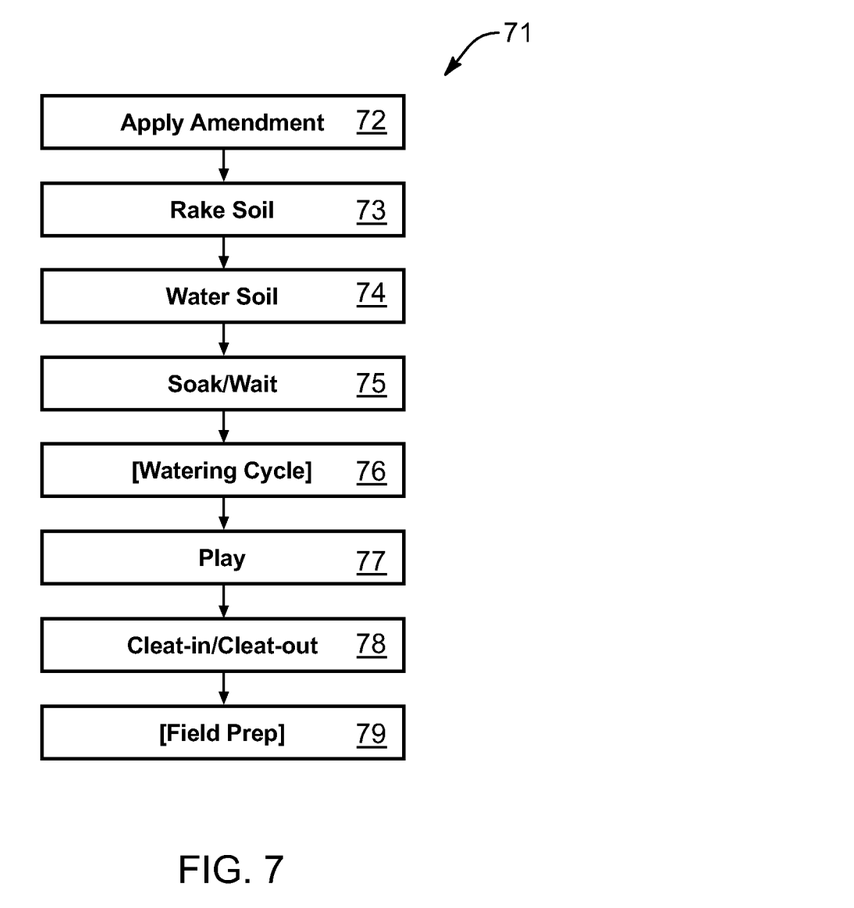
FIG. 7 is a schematic block diagram of a preparatory soil amendment method in accordance with the invention.

Referring to FIG. 7, a method 71 in accordance with the invention may involve applying 72 an amendment to a plain soil such as a soil of a sports playing field, an arena, a track, or the like. Such soils may be involved with sports facilities, baseball fields, softball fields, equestrian arenas, racetracks, golf courses including greens and bunkers, football fields, soccer fields, moto-cross tracks, cycling tracks or the like. Typically, such environments are characterized by bare soils in at least certain regions, in an outdoor environment. In such venues, whether for sporting, play, or industrial sites, the need for consistent soils, and particularly for drying of soils, is substantial.

Accordingly, in the method 71 of FIG. 7, an amendment 10 may be applied 72 to a soil 50. The rate of application may vary depending on the purpose. In one presently contemplated embodiment, the amendment 10 may be added at a rate of anywhere from about half an ounce per square foot, and perhaps less, up to about four ounces per square foot. Lesser amounts will provide less effect. Greater amounts will provide a greater effect, but may become too costly. Likewise, if the amount is worked into a comparatively thin layer 50 of soil 50, then the desirable effect may eventually be lost by an excessive amount of the amendment 10.

After application 72 of the amendment 10, raking 73 or otherwise working 73 the amendment 10 into the soil 50 may distribute the amendment 10 to a depth of from about one to about three inches. Comparatively greater depths tend to provide comparatively better soil remediation. Nevertheless, such depths greater than three inches begin to become less economical. Accordingly, a depth of from about one to about three inches has been found most suitable.

By raking 73 may be applied the expression "working" 73 in order to mix the amendment 10 substantially evenly throughout the layer 50 of soil. In preparation for the use of the field on which the amendment 10 has been raked in 73, such as by harrowing, disking, dragging, drilling, or the like, the soil layer 50 may be watered 74. Following initial watering 74, the procedure 71 may wait 75 or simply soak 75. By soak 75 is meant to permit the water to soak 75 into the soil layer 50, rather than pooling up, running off, or the like.

Typically, a watering cycle of from about fifteen to about thirty minutes is adequate. By contrast, a soil, such as the red clay common to baseball diamonds, typically requires several soaks beginning at an hour in length and decreasing in fifteen minute increments to about thirty minutes and sometimes less for the final watering. Thus two, three, or four waterings may be required in advance of a game in order to prepare the soil.

By contrast, in using the amendment 10 in accordance with the invention, watering times may be reduced to three or less, or even two waterings, and these may be typically, about thirty minutes, followed by about fifteen minutes. As a result, the polymer 18 in the amendment 10 provides holding of the water, distribution of the water when the soil is used, thus reducing dust, and likewise provides a certain amount of softness and "natural bounce" in the soil 50 that may otherwise become overly compacted and hard.

For example, a baseball bouncing on a field will tend to strike a compacted surface and bounce higher, the soil being harder and having a higher coefficient of restitution. By contrast, a softer and more easily resilient soil may tend to absorb more of the shock, and thus provide more of a natural bounce such as would be seen on undisturbed or non-compacted soils.

The watering 76 may be repeated. For example, the brackets on the label of the step 76 indicate that this step is optional. It also may be repeated. For example, additional watering 74 and soaking 75 may occur. Likewise, the watering cycle 76 may be renewed as game time approaches according to the perceived need that a groundskeeper may determine.

Ultimately, the playing 77 on the field occurs with the soil layer 50 amended as described. As playing 77 continues, a certain amount of mixing 78, such as churning by wheels or hooves, or cleat-in and cleat-out working, of the soil layer occurs. The depth of the working is accommodated by the layer 50 containing sufficient moisture to maintain a soil that is neither too difficult to grip and thus releases, nor too hard and thus holding and not permitting a proper degree of working of the soil. Likewise, the resilience of the soil provides a better running surface rather than the hard jarring of a compacted surface.

The preparation 79 of the field may continue during a game or other event with the raking or dragging of the field in order to re-level the field and remove tracks and divots. Nevertheless, preparation 79 during a game is optional. Likewise, at some point in the future, such as a following day or later in the same day if a double header is being played in a baseball game, then preparation 79 may be renewed with any number of the steps from the process 71 as may be required according to the soil, the condition of the soil, and the weather.

For example, in a situation where a northern climate is experiencing overcast and rain, very little moisture will be removed from the soil layer 50 during the day. By contrast, a summer game in a solar venue such as Phoenix, Ariz. may require additional steps of the process 71 to be repeated upon checking on the soil condition.

Figure 8:
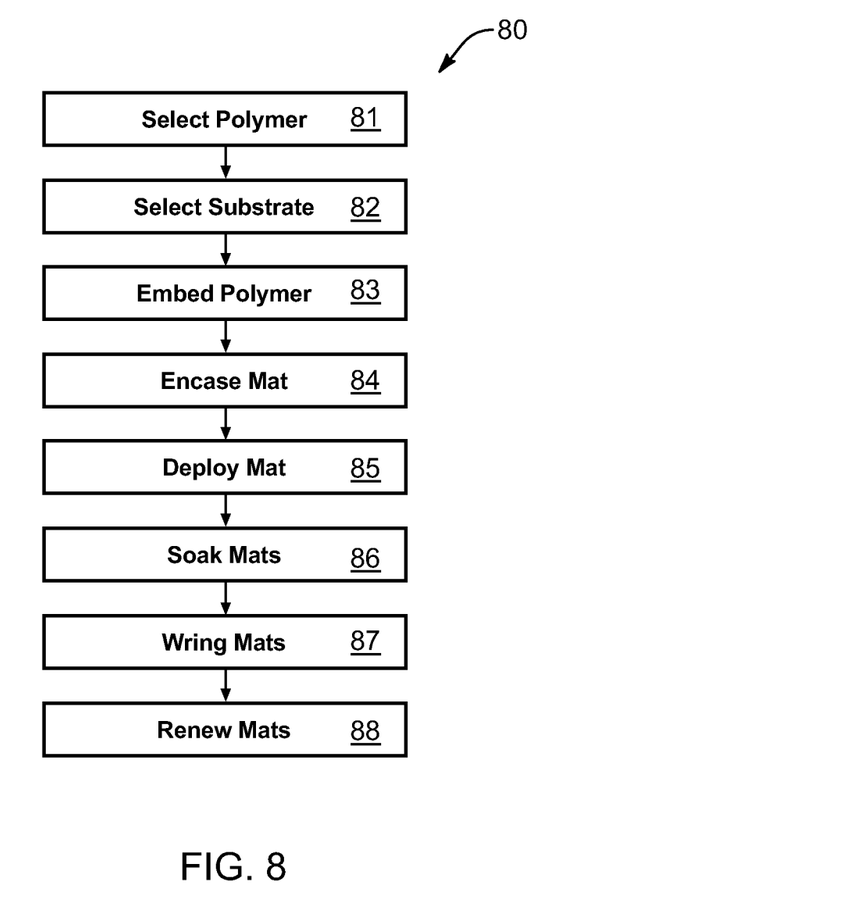
FIG. 8 is a schematic block diagram of a method for working and using mats in accordance with the invention.

Referring to FIG. 8, a process 80 or method 80 for creating the mats 60 may involve selecting 81 a polymer 18. Much description of the characteristics of the polymer particles 18 is included hereinabove. Upon selecting 81 a particular polymer 18, a substrate may be selected 82. The selection 82 of a substrate 12 may use different criteria than a material 10 to be mixed into the soil.

For example, chunks, layers, bats, blocks, or the like may be selected from a foam 62 operating as a carrier 12. Typically, an open-cell foam 62 has been found effective. Typically, foams such as polyurethane foams 62 have been shown to be suitable. After selecting 82 a substrate, embedding 83 the polymer 18 into the substrate 12 may involve tumbling, working, or otherwise manipulating the foam 62 in order that the powder particles 18 may be drawn through or pumped through by the flow of air through the open cells of the foam 62. Thus, the polymer 18 becomes embedded 83 within the inner cavities 64, or vacuoles 64 of the foam 62.

In order to preserve the appearance, handling, and keeping polymer particles 18 from migrating out of the foam 62, the mat 60 may be encased with a cover 66. The cover 66 may be closed by permanent seams 68. The cover 66 may be typically formed of a fabric, such as a polymer material that is stain resistant. Cotton serves well to soak liquids therethrough, but polyester tends to absorb less staining. Other synthetic polymers may be used including fiberglass fabric, and the like.

Encasing 84 may also include providing zippers for opening, but permanent seams 68 along the edges of a cover 66 have been found sufficient in order to handle and clean mats and to contain the foam 62 and the particles 18 therein. Deploying 85 the mats may include placing them for storage in locations where they may be readily accessible in case of a storm. Typically they will be maintained in an area where they can maintain air drying on a continuing basis.

When rain accumulates a standing water layer 70 in troublesome parts of a playing field, the mats be deployed by placing them in standing water 70 where they may soak 86 the water 70 thereinto. Squeezing the mats 60 tends to pump water into the vacuoles 64 or holes 64 or interstices 64 within the foam 62. Nevertheless, the foam materials tend to not have a great initial affinity for water. Thus, the hydrophillic particles 18 have been found to quickly absorb and encourage absorption and holding of the water 70 in the foam 62. After soaking 86, the mats 60 may be removed to be emptied.

Wringing 87 the mats 60 drives the water 70 out of them. A certain amount of the water 70 has been absorbed by the particles 18, but the particles 18 typically constitute only about one percent or less of the weight of the mat 60. The mats may be wrung 87 in order to remove water, and returned to the standing water 70 areas of the field to soak up more water. After the water has all been removed, the mats 60 may be wrung substantially dry one last time, after which they may be hung up to be air dried.

Renewing 88 the mats 60 may involve drying, washing, and the like. Drying may be done in the sun, in the shade, or in a machine. Drying may involve air, hot air, sun, a combination, or the like. Typically, the covers 66 may be washed with the foam 62 inside, or without it. In any event, the covers 66 may be formed of a fabric that tends to resist staining in order that they appear substantially new upon each reuse.

Figure 9:
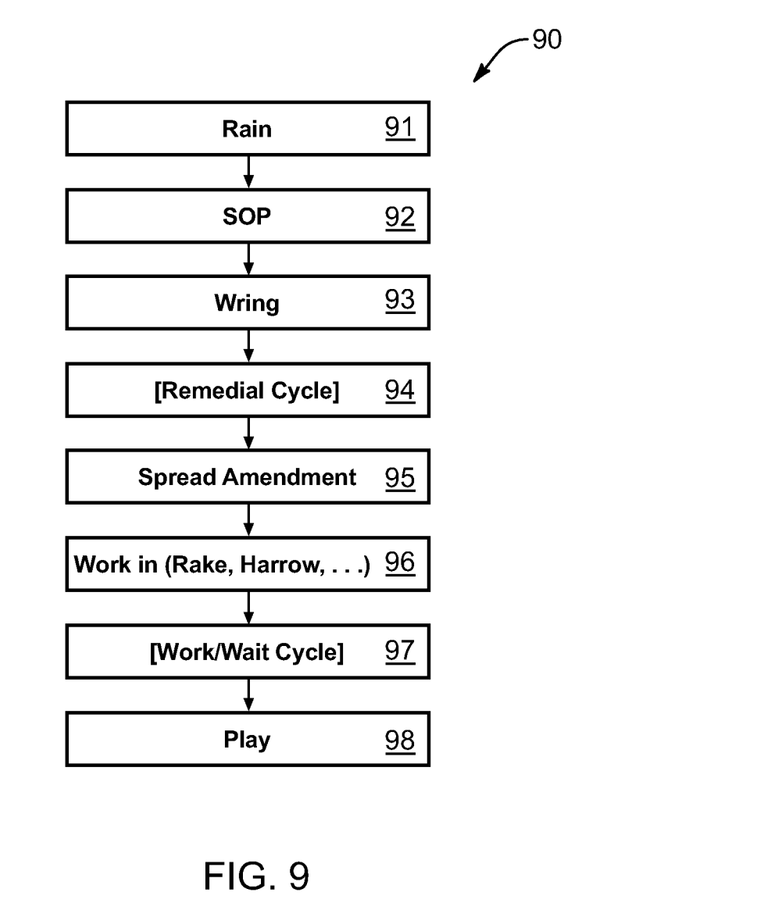
FIG. 9 is a schematic block diagram of a process for soil remediation by mats and soil amendment in accordance with the invention.

Referring to FIG. 9, the process of remediating a field, in addition to the process 71 of preparing the soil in order to be a proper, dust-free, resilient playing field, may be accomplished by the process 90 or method 90. In the process 90, rain 91 or raining 91 typically leaves puddled or pooled standing water 70 in particular locations on a field. These may be problematic in problem areas, where they may form mud, and where traffic needs to travel during an event. Accordingly, the mats 60 may be deployed to sop 92 (soak up) the standing water 70 from locations where it is pooled on the field, arena, track, ground, or other venue. Following wringing 93 of the mats 60, and possible repetition of sopping 92 and wringing 93, the field will almost be ready for play. The optional remedial cycling 94 may be repeated. That is, sopping 92 and wringing 93 may be repeated any number of times during a game, or in any particular removal of standing water 70 on a field.

In problem areas on a field, such as those that tend to form mud, spreading 95 the amendment 10 on the soil after the standing water 70 has been removed may be an important step. Typically, after spreading 95 working 96 the amendment 10 into the soil may be accomplished by something as simple as a hand rake, a nail board, some other type of harrow, or the like. Typically, working 96 is easily done by hand because a common garden rake can be used to work 96 the amendment 10 into the soil layer 50 about a half inch to an inch.

Typically, again, the cleat depth may be a guide. In working 96 the amendment 10 that has been spread, the lower concentration of the polymer particles 18 may typically be used. For example, about five percent by weight of the granular material 10 may be the particles 18 of the hydrophillic polymer 18. Ultimately, a certain amount of time may be required for waiting 97, or reworking 97 and waiting 97, in an optional cycle that may stir the soil layer 50 to the desired depth in order to remediate any water effectively held in suspension by the surface tension of the water and the particles of the soil. Typically, following a fifteen to sixty minute wait, and oftentimes only a thirty to forty-five minute wait, playing 98 may resume.

Certain experiments were conducted using the material 10 in accordance with the present invention. For example, the material 10 was added in at rates of from about a half ounce to about two ounces per square foot. One pint for about 25 square feet is typical. Applying the material 10, mixing it into the soil and watering the surface tended to provide a consistent moisture level to provide a firm but effectively dry soil surface with low dust and good "natural bounce." Half the watering times normally required, and even less, obtain superior results. Mixing depths were one to three inches. Deeper is usually better than shallower but that is a cost issue. Applying the mats 60, followed by sprinkling the material 10 over the soil after rain fell on the ground, and then working the material 10 into the top half to one inch (e.g. cleat depth) of the soil layer 50, in about the same proportions, provided absorption of excess water and remediation of the soil 50 to a playable condition within about 45 minutes.

In the foregoing experiments, the particles 18 were of polyacrylamide, and the substrate 12 was a silica material, largely sand. Coloring was accomplished by using a black slag as a fraction of the sand substrate 12. The polyacrylamide constituted approximately 5 percent by weight of the overall material 10 in the post-rain mixing embodiment. Six percent by weight of the polymer 18 was used in the preparatory mixing with field soils. The particle size 18 was approximately a 60 mesh granularity.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for treating soils, the method comprising:
   selecting a field comprising soil having a surface exposed;
   providing an amendment comprising granules formed of a substrate holding particles of a polymer, selected to be hydrophilic and secured to the substrate;
   selecting a region of the field;
   selecting a depth;
   distributing the amendment about the region;
   mixing the amendment into the region and between the surface and the depth;
   exposing the surface to water;
   absorbing a portion of the water by hydrating the polymer in the soil;
   returning the surface to a condition suitable for its intended use by the absorbing.
2. The method of claim 1, wherein the application ratio of the amendment is about one quarter to about two ounces by weight per square foot.
3. The method of claim 2, wherein the ratio is from about half an ounce to about one ounce per square foot.
4. The method of claim 3, wherein the ratio is about two thirds ounce per square foot.
5. The method of claim 1, wherein the water in the soil is introduced artificially and intentionally after the mixing of the amendment into the region.
6. The method of claim 1, wherein the water is introduced naturally and unintentionally, before the mixing of the amendment into the region.
7. The method of claim 6, further comprising providing a mat embedded with the polymer.
8. The method of claim 7, further comprising sopping, into the mat, a standing portion of the water before distributing and mixing the amendment into the region.
9. The method of claim 1, wherein the field is selected from a sporting field, and the soil in the region is sufficiently bare to be substantially absent foliage.
10. The method of claim 9, wherein the sporting field is configured to be at least one of:
    a baseball diamond, a softball diamond, a volleyball court, a tennis court, a golf course, a football field, a soccer field, a racing track, an arena, and a performance field.
11. The method of claim 1, wherein the substrate is an inorganic material.
12. The method of claim 11, wherein the inorganic material comprises a pigment identifying the amendment in accordance with a property of the amendment.
13. The method of claim 1, wherein:
    the application rate of the amendment is about one quarter to about two ounces by weight per square foot;
    the water in the soil is introduced by at least one of
       artificial and intentional watering after the mixing of the amendment into the region, and
       natural and unintentional watering, before the mixing of the amendment into the region;
    the field is selected from a sporting field having the soil in the region sufficiently bare to be substantially absent foliage;
    the field is configured to be at least one of a baseball diamond, a softball diamond, a volleyball court, a tennis court, a golf course, a football field, a soccer field, a racing track, an arena, and a performance field;
    the substrate is an inorganic material; and
    the polymer is an artificially formulated polymer.
14. A method of remediating a soil surface, the method comprising:
    providing a substrate formed as granules, each having an exterior surface;
    providing particles formed of a hydrophilic material, the particles being comminuted to a size smaller than the size of the granules;
    coating the granules with the particles to form the granules containing the particles on the exterior surfaces thereof;
    designating a soil region;
    designating a soil depth;
    controlling free water in the soil within the region by distributing the granules throughout the soil region and soil depth to absorb at least a portion of the free water.
15. A composition to treat soils susceptible to periodic moisture from weather, the composition comprising:
    a substrate comprising granules of an inorganic material, each granule having an outer surface and a size characterized by a maximum dimension thereacross, and all the granules together having an average maximum dimension corresponding thereto;
    a polymer, comprising a hydrophilic material selected to absorb water in an amount greater than the weight thereof and bound to the substrate;
    the polymer, comminuted to particles, each particle having a size characterized by a maximum dimension thereacross and all the particles characterized by an average maximum dimension, the average maximum dimension of the particles being smaller than the average maximum dimension of the granules.
16. The composition of claim 15, wherein the polymer is selected to form a gel when exposed to water.

17. The composition of claim 15, wherein the inorganic material is selected from sand, gravel, vermiculite, and perlite.

18. The composition of claim 15, wherein the polymer is synthetic.

19. The composition of claim 18, wherein the polymer is polyacrylamide.

20. The composition of claim 15, wherein the polymer is selected to have a porosity preferentially binding water to the particles thereof to preferentially draw water away from the soil surrounding the polymer.

* * * * *